June 16, 1931.　　　E. V. FRANCIS　　　1,810,419
TROLLEY CONVEYER
Filed April 21, 1930　　2 Sheets-Sheet 2

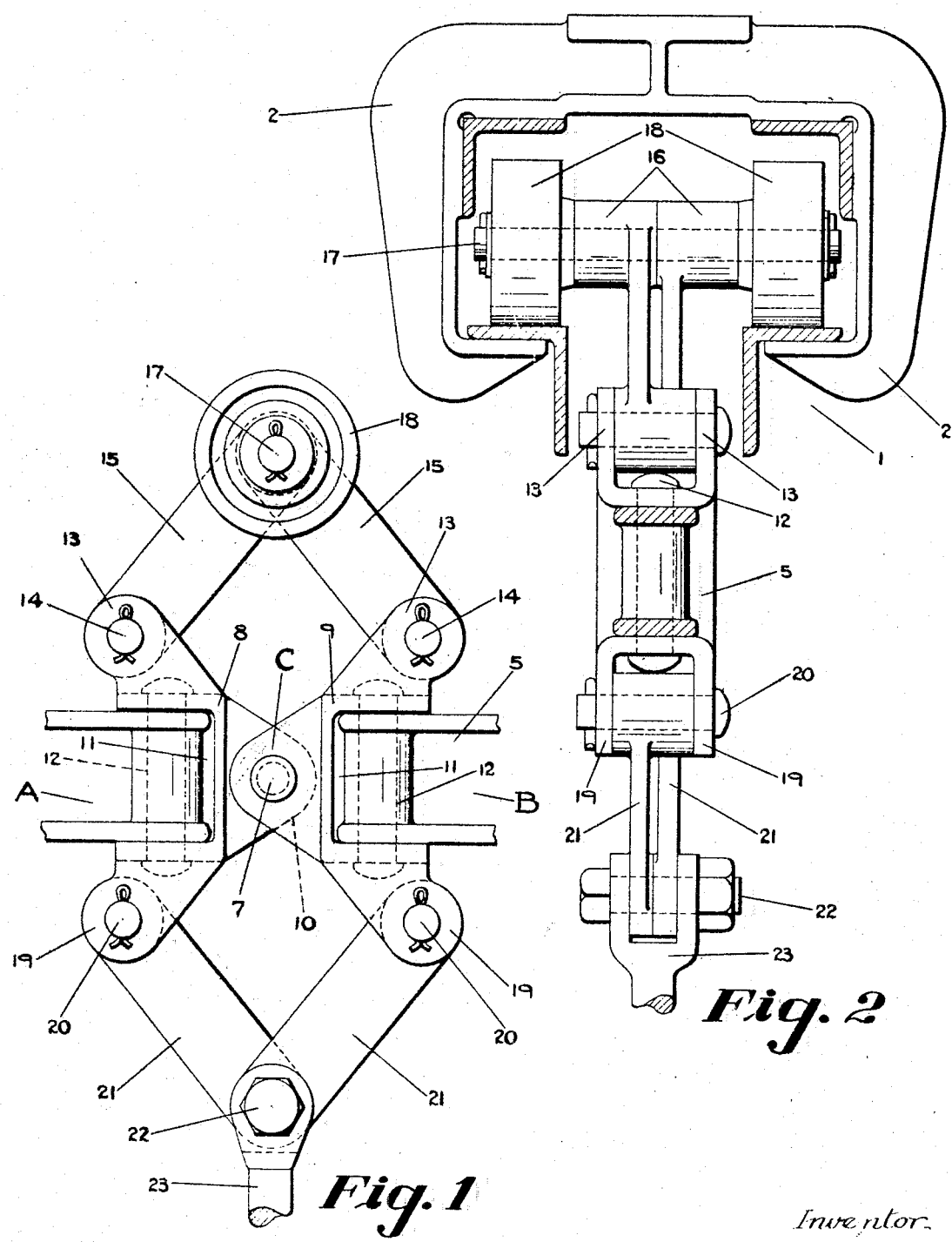

Inventor
Earle V. Francis

By Cushman, Bryant Darby
Attorneys

Patented June 16, 1931

1,810,419

UNITED STATES PATENT OFFICE

EARLE V. FRANCIS, OF COLUMBUS, OHIO, ASSIGNOR TO THE JEFFREY MANUFACTURING COMPANY, OF COLUMBUS, OHIO, A CORPORATION OF OHIO

TROLLEY CONVEYER

Application filed April 21, 1930. Serial No. 446,070.

This invention relates to new and useful improvements in trolley conveyers of the type disclosed in my copending application, Serial No. 275,212, filed May 4, 1928, and Serial No. 416,187, filed December 23, 1929, in which a series of load supports or trolley hangers are connected in series to be propelled along a trackway.

An important object of the invention is to provide a conveyer in which it may be said that the trolley hangers or load supports are incorporated in the draft device or chain to cause portions thereof to assume corresponding angular relation with respect to the connecting portions in traversing vertical curves in a trackway.

Another important object of the invention is to provide a toggle mechanism for accomplishing the foregoing object, and which will cause the center line of the toggle mechanism to be disposed radially with respect to a curve which it traverses.

Other objects and advantages of the invention will become apparent during the course of the following description.

In the accompanying drawings forming a part of the description, and wherein like numerals are employed to designate like parts throughout the several views:

Figure 1 is a side elevation of the invention illustrating the positions of the various parts in traversing straight trackway.

Figure 2 is a transverse section of the same taken on the line 2—2 of Figure 1 illustrating the device suspended from a trackway.

Figure 3:
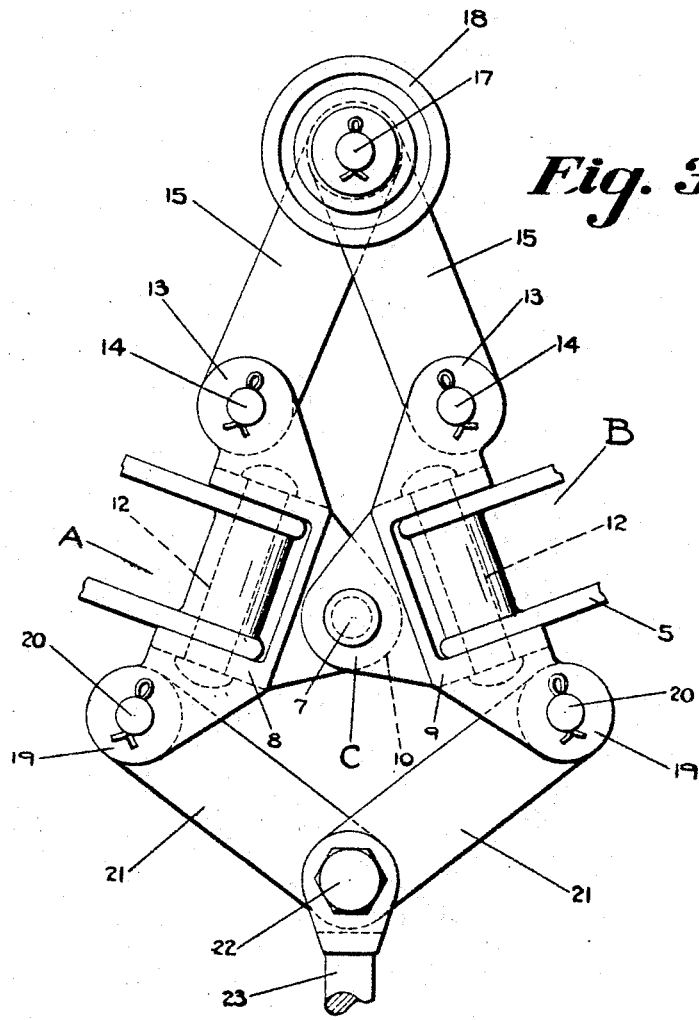
Figure 3 is a side elevation of the invention showing the positions of the various parts of the device when traversing a curve in the trackway.

In trolley conveyers, provision must be made for permitting flexing of the conveyer or draft chain on both horizontal and vertical pivots to enable the draft device to traverse both horizontal and vertical curves in the overhead trackway. In my copending applications, I have shown several different ways of providing for the proper flexing of the conveyer chain, whereby all breaking strains and stresses are removed from the conveyer chain when it traverses both horizontal and vertical curves in a trackway. In all of these foregoing forms of trolley conveyer, trolley hangers proper have been connected to the draft device at intervals throughout its length, but, in the present form of device, a trolley hanger body proper is not employed, and the toggle mechanism is incorporated more or less directly in the conveyer chain proper.

Referring now more particularly to the drawings, the numeral 1 designates an overhead trackway supported in any suitable manner, usually by hangers 2 suspended from the structural work of a building in which the conveyer is to be installed. A draft device or conveyer chain 5 is composed of a series of chain links joined on vertical axes by vertically disposed pintles 6. This construction obviously provides a conveyer chain which will properly flex in horizontal planes in passing about horizontal curves.

In order to equip the chain with means enabling it to flex on horizontal axes in passing about vertical curves in a trackway and, at the same time, prevent breaking stresses being imposed upon the links of the chain in portions A and B, which are arranged on opposite sides of the horizontal axes C, the portions A and B of the chain are connected together on horizontal axes 7 wherever it is desired to incorporate a trolley or load support in the chain, by means of connecting links 8 and 9. The connecting link or clevis 9 is bifurcated to receive a projection 10 of the link 8 or clevis, and these parts are equipped with registering apertures to receive the horizontal pivot pins 7. These two connecting links are each further bifurcated as at 11 to receive the end links of the chain portions A and B, whch are pivotally connected to the connecting links 8 and 9 by means of the vertical pivot pins 12.

The links 8 and 9 are further provided at their upper ends with a pair of upstanding spaced apertured ears 13, between which are pivotally connected by pins 14, a pair of toggle levers or links 15. The upper ends of these two links are equipped with apertured barrels 16, through which project an axle 17, on the ends of which are rotatably mounted rollers 18 for support upon the trackway 1. Thus, the conveyer chain is supported from the overhead trackway.

The lower ends of each of the links 8 and 9 are also equipped with a pair of apertured ears 19, between which is pivotally connected, by means of the pivot pins 20, a second pair of toggle members or links 21. These links 21 are pivotally connected at their corresponding ends by a pivot bolt 22, which also extends through a bifurcated upper end of a load support 23, thereby pivotally suspending the load support from the toggle mechanism and connecting links.

Figure 4:
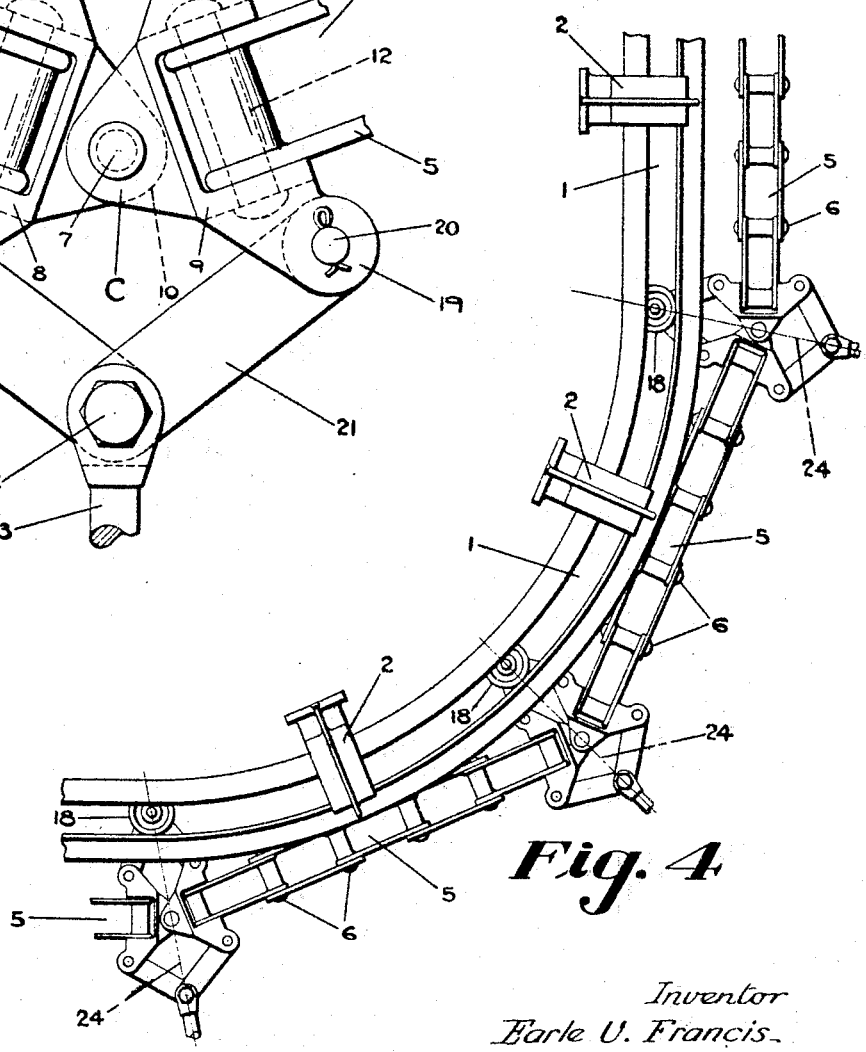
Figure 4 is a side elevation of the conveyer passing about a vertical curve.

When the conveyer chain is traversing the straight portion of a trackway, the parts of the chain assume the positions shown in Figure 1, wherein it will be noted that the horizontal axes 7, 17 and 22 are all arranged in the same vertical plane with the portions of the chain A and B extending perpendicularly to such plane. This is the position assumed by the parts when traversing straight portions of the trackway, and when the chain traverses horizontal curves, the links of the chain pivot upon their vertical axes 6 and 12. Whenever the chain traverses a vertical curve in a trackway, the toggle links 15 and 21 will cause the connecting links 8 and 9 to swing on their axes 7, and will compel these links to be disposed at equal angles with respect to a plane passing through the pivot pins 7 and 17, indicated by the dotted lines 24 illustrated in Figure 4. In other words, the links 8 and 9 will be caused by the toggle links to swing an equal degree in opposite directions about the pivot 7 to cause the portions of the chain A and B, on opposite sides of this toggle mechanism to assume substantially the same angular relation with respect to the plane 24 in passing about vertical curves, whereby the line of reaction of the parts, also indicated by the dotted lines 24 in Figure 4, will be normal to the curve in the trackway, so as to eliminate all breaking stresses which would otherwise be imposed upon the links of the conveyer chain.

Viewed in another aspect, the toggle links 15 and rollers 18 may be said to constitute trolley hanger portions of the device, while the toggle links 21 and load supports 23 may be said to constitute the load supporting portions of the trolley hangers. It is to be understood that many variations of the device may be made without departing from the invention, as for instance, the load supports may be hung directly from the horizontal pivots 7, and the toggle links 21 be pivoted together independently of the load supports, and likewise the upper set of toggle members 15 may be pivotally joined independently of the axle 17 and the rollers 18 may be carried by a trolley hanger which is connected to the horizontal pivot of the links 8 and 9. Many other variations may be made, and it is to be understood that such are comprehended by the invention as will fall within the scope of the appended claims.

I claim:

1. A conveyer chain comprising a series of links joined on axes, a pair of elements included therein and pivotally connected on an axis at right angles to said axes and levers pivotally connected to said elements to produce equal and opposite pivotal movement thereof.

2. A conveyer chain comprising a series of links joined on axes, a pair of elements included therein and pivotally connected on an axis at right angles to said axes, and levers pivotally connected together and to said elements to produce equal and opposite pivotal movement thereof.

3. A conveyer chain comprising a series of links joined on axes, a pair of elements included therein and pivotally connected on an axis at right angles to said axes, and means connecting said elements on opposite sides of their axis to produce equal and opposite pivotal movement thereof.

4. In a conveyer, a trackway, a conveyer chain comprising a series of links joined on axes, a pair of elements included therein and pivotally connected together on an axis at right angles to said axes, and a pair of links freely pivotally suspending said elements from a trackway.

5. A conveyer chain comprising a series of links joined on axes, a pair of elements included therein and pivotally connected on an axis at right angles to said axes, a trolley, and a pair of links pivotally suspended therefrom and pivotally connected to said elements.

6. A conveyer chain comprising a series of links joined on axes, a pair of elements included therein and pivotally connected on an axis at right angles to said axes, and toggle links connecting corresponding ends of said elements to produce equal and opposite pivotal movement thereof.

7. A conveyer chain comprising a series of links joined on axes, a pair of elements included therein and pivotally connected on an axis at right angles to said axes, and pairs of toggle links connecting corresponding ends of said elements on opposite sides of their axis to produce equal and opposite pivotal movement of said elements.

8. A conveyer chain comprising a series of links joined on axes, a pair of elements included therein and pivotally connected on an axis at right angles to said axes, a wheeled axle for travel on a trackway, and a pair of links pivotally suspended from said axle and pivotally connected to said elements.

9. A conveyer chain comprising a series of links joined on axes, a pair of elements included therein and pivotally connected on an axis at right angles to said axes, a wheeled-axle for travel on a trackway, a pair of links pivotally suspended from said axle and pivotally connected to said elements, and a load carrier suspended from said elements.

10. A conveyer chain comprising a series of links joined on axes, a pair of elements included therein and pivotally connected on an axis at right angles to said axes, a wheeled-axle for travel on a trackway, a pair of links pivotally suspended from said axle and pivotally connected to said elements, a load carrier, and a pair of links pivotally connected thereto and to corresponding ends of said elements.

11. A conveyer chain comprising a series of links joined on axes, a pair of elements included therein and pivotally connected on an axis at right angles to said axes, and a load carrier suspended from said elements to produce equal and opposite pivotal movement thereof.

12. In a conveyer, a trackway, a conveyer chain comprising a series of links joined on axes, a pair of elements included therein and pivotally connected together on an axis at right angles to said axes, means for suspending said chain from said trackway, and toggle means associated with said elements to produce equal and opposite pivotal movement thereof.

13. In a conveyer, a trackway, a conveyer chain comprising a series of links joined on axes, a pair of elements included therein and pivotally connected together on an axis at right angles to said axes, means for suspending said chain from said trackway, and a load carrier including a pair of toggle links connected to corresponding ends of said elements.

14. A conveyer chain comprising a series of links joined on vertical axes, a pair of elements included therein and pivotally connected together on a horizontal axis, and a toggle mechanism associated with said elements to produce equal and opposite pivotal movement thereof.

In testimony whereof I have hereunto set my hand.

EARLE V. FRANCIS.